United States Patent
Lietsalmi

(10) Patent No.: US 9,202,236 B2
(45) Date of Patent: Dec. 1, 2015

(54) ASSOCIATING FINANCIAL TRANSACTION WITH ADVERTISEMENT

(71) Applicant: OIKIAN SOLUTIONS OY, Oulu (FI)

(72) Inventor: Mikko Lietsalmi, Oulu (FI)

(73) Assignee: OIKIAN SOLUTIONS OY, Oulu (FI)

( * ) Notice: Subject to any disclaimer, the term of this patent is extended or adjusted under 35 U.S.C. 154(b) by 110 days.

(21) Appl. No.: 13/773,738

(22) Filed: Feb. 22, 2013

(65) Prior Publication Data

US 2013/0226712 A1 Aug. 29, 2013

(30) Foreign Application Priority Data

Feb. 24, 2012 (EP) ..................................... 12156816

(51) Int. Cl.
*G06Q 30/02* (2012.01)

(52) U.S. Cl.
CPC ............ *G06Q 30/0273* (2013.01); *G06Q 30/02* (2013.01)

(58) Field of Classification Search
None
See application file for complete search history.

(56) References Cited

U.S. PATENT DOCUMENTS

| 2005/0273388 A1* | 12/2005 | Roetter ........................... 705/14 |
| 2008/0320004 A1 | 12/2008 | Jain et al. |
| 2009/0259517 A1 | 10/2009 | Wise |

FOREIGN PATENT DOCUMENTS

| WO | 2007/022108 A2 | 2/2007 |
| WO | 2008/096206 A9 | 8/2008 |
| WO | WO 2008096206 A1 * | 8/2008 |

OTHER PUBLICATIONS

European Search Report dated May 29, 2012 for corresponding European Patent Application No. 12 15 6816.

* cited by examiner

*Primary Examiner* — John G Weiss
*Assistant Examiner* — Romeo R Smellie
(74) *Attorney, Agent, or Firm* — Barnes Thornburg LLP

(57) ABSTRACT

A method for associating a financial transaction with an electronic advertisement including obtaining unique electronic tokens for each potential financial transaction resulting from an electronic advertisement of an advertiser to consumers; storing the unique electronic tokens as stored tokens associated with the electronic advertisement; transmitting the unique electronic tokens as distributed tokens to the advertiser; receiving at least one of the distributed tokens that has been passed from the advertiser to a consumer in relation to a financial transaction based on the electronic advertisement; and associating each financial transaction identified by the received distributed token with the electronic advertisement identified by the stored tokens, if the received distributed token matches with the stored token.

13 Claims, 6 Drawing Sheets

ASSOCIATING FINANCIAL TRANSACTION WITH ADVERTISEMENT

PRIORITY CLAIM

This patent application claims priority to European Patent Application No. 12156816.6, filed 24 Feb. 2012, the disclosure of which is incorporated herein by reference in its entirety.

FIELD

Disclosed embodiments relate to associating a financial transaction with an electronic advertisement.

BACKGROUND

Electronic advertisement with various mobile and web applications is rapidly growing. With these applications the advertiser pays either for visibility or for clicks but the advertiser cannot actually know if the advertisement generates any purchases.

This is because the advertiser needs to invest in an advertisement upfront without knowing at that point what kind of results the advertisement will generate. Effectiveness of the advertisement is measurable only afterwards, i.e., only after the investment for the advertisement has already been made.

Furthermore, it is very difficult to connect a purchase to a single advertisement that caused the purchase made at the point of sale.

Several companies like Facebook, foursquare, SCVNGR, CheckPoints and shopkick implement time and location specific advertising but with these solutions an advertisement is not connected to a resulting purchase.

Groupon/CityDeal and LivingSocial offer advertising to businesses so that both an advertisement and the resulting purchase reside inside the Groupon or LivingSocial system, i.e., the transaction is taken away from the advertiser's own point of sale, which, to many advertisers is unacceptable due to trade secret and data security.

SUMMARY

Disclosed embodiments provide an improved server, an improved consumer client, improved computer programs, and an improved method for associating a financial transaction with an electronic advertisement.

BRIEF DESCRIPTION OF THE FIGURES

Disclosed embodiments are described below, by way of example only, with reference to the accompanying drawings, in which.

DETAILED DESCRIPTION

Figure 1:
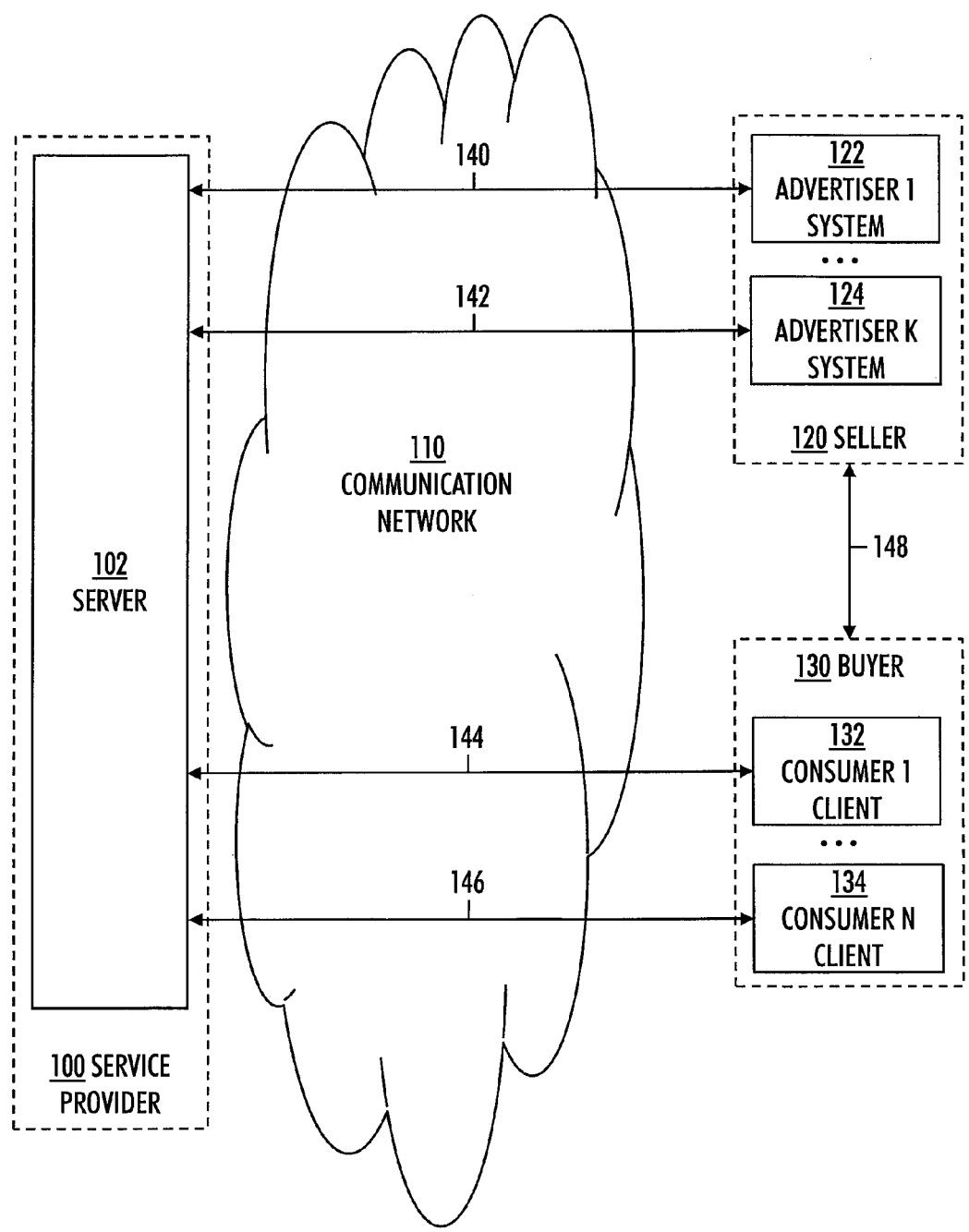
FIG. 1 shows disclosed embodiments of an advertiser system, a server, and a consumer client.

Disclosed embodiments provide a server comprising a communication interface; one or more processors; and one or more memories storing instructions, that, when executed by the one or more processors, cause the server to: obtain unique electronic tokens for each potential financial transaction resulting from an electronic advertisement of an advertiser to consumers; store the unique electronic tokens as stored tokens associated with the electronic advertisement; transmit, through the communication interface, the unique electronic tokens as distributed tokens to the advertiser; receive, through the communication interface, at least one of the distributed tokens that has been passed from the advertiser to a consumer in relation to a financial transaction based on the electronic advertisement; and associate each financial transaction identified by the received distributed token with the electronic advertisement identified by the stored tokens, if the received distributed token matches with the stored token.

Another disclosed embodiment provides a non-transitory computer-readable storage medium comprising a computer program comprising instructions which, when loaded into a computer cause the computer to perform: obtain unique electronic tokens for each potential financial transaction resulting from an electronic advertisement of an advertiser to consumers; store the unique electronic tokens as stored tokens associated with the electronic advertisement; transmit the unique electronic tokens as distributed tokens to the advertiser; receive at least one of the distributed tokens that has been passed from the advertiser to a consumer in relation to a financial transaction based on the electronic advertisement; and associate each financial transaction identified by the received distributed token with the electronic advertisement identified by the stored tokens, if the received distributed token matches with the stored token.

Yet another disclosed embodiment provides a consumer client comprising: a communication interface; an input interface; one or more processors; and one or more memories storing instructions, that, when executed by the one or more processors, cause the consumer client to: receive, through the communication interface, an electronic advertisement of an advertiser; receive, through the input interface, a distributed token that has been passed from the advertiser to a consumer in relation to a financial transaction based on the electronic advertisement; and transmit, through the communication interface, the distributed token to a server in order to associate the financial transaction identified by the received distributed token with the electronic advertisement so that the consumer receives from the financial transaction a discount and/or a bonus.

A further disclosed embodiment provides a non-transitory computer-readable storage medium comprising a computer program comprising instructions which, when loaded into a computer cause, the computer to perform: receive an electronic advertisement of an advertiser; receive a distributed token that has been passed from the advertiser to a consumer in relation to a financial transaction based on the electronic advertisement; and transmit the distributed token to a server in order to associate the financial transaction identified by the received distributed token with the electronic advertisement so that the consumer receives from the financial transaction a discount and/or a bonus.

Another disclosed embodiment provides a method comprising: obtaining unique electronic tokens for each potential financial transaction resulting from an electronic advertisement of an advertiser to consumers; storing the unique electronic tokens as stored tokens associated with the electronic advertisement; transmitting the unique electronic tokens as distributed tokens to the advertiser; receiving at least one of the distributed tokens that has been passed from the advertiser to a consumer in relation to a financial transaction based on the electronic advertisement; and associating each financial transaction identified by the received distributed token with the electronic advertisement identified by the stored tokens, if the received distributed token matches with the stored token.

The disclosed embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

FIG. 1 illustrates a disclosed embodiment of the general operating environment including an advertiser system 122, a server 102, and a consumer client 132. Generally speaking, the advertiser system 122 is a data processing system of an advertiser/seller 120, the server 102 is a collection of computing resources implementing electronic advertisement services by a service provider 100, and the consumer client 132 is any computing device implementing user interface of the electronic advertisements for a buyer 130.

The roles of various actors are thus the following: the service provider 100, the seller (=the advertiser) 120, and the buyer 130. The financial transaction is denoted by reference numeral 148 between the seller 120 and the buyer 130. The seller/advertiser 120 provides an electronic advertisement 140 or advertisement data for the service provider 100, and the service provider 100 presents the electronic advertisement 144 for the buyer 144, whereupon the financial transaction 148 relating to the electronic advertisement 140, 144 is realized. The financial transaction 148 may be a purchase based on the electronic advertisement 144, for example. In at least one disclosed embodiment, the electronic advertisement 140, 144 relates to at least one of the following: a good (=a tangible commodity such as a product and material), a service (=an intangible commodity), a sales item (=an itemized product that participates in a sales process) subjected to the financial transaction 148.

Note that that there may be a plurality of advertisers, and, consequently, a plurality of advertiser systems 122, 124, wherein the plurality may be determined as a number K, K being any integer greater than one. Note also that there may be a plurality of consumers, and, consequently, a plurality of consumer clients 132, 134, wherein the plurality may be determined as a number N, N being any integer greater than one. However, for the sake of clarity and simplicity, the discussion in the rest of the description mainly relates to only one advertiser system 122 and one consumer client 132, but the disclosed embodiments are not limited to such examples because they may easily be implemented to an environment including a plurality of advertiser systems 122, 124 and a plurality of consumer clients 132, 134.

The server 102 may communicate 140, 142 through a communication network 110 with the advertiser system 122, 124. The server 102 may also communicate 144, 146 through the communication network 110 with the consumer client 132, 134. The communication network 110 may include an individual wired/wireless system, or any combination of a plurality of various wired and/or wireless systems. Consequently, the communication network may include at least one of the following: a computer network, a private network, the Internet, the telephone network including the public switched telephone network and all wireless networks. In at least one disclosed embodiment, the communication network 110 is an IP-based network (TCP/IP=Transmission Control Protocol/Internet Protocol).

In another disclosed embodiment, the electronic advertisement 144 is mobile and/or web advertisement, and, consequently, the communication network 110 at least includes the Internet and/or all wireless networks.

In yet another disclosed embodiment, the advertising is targeted, whereby a targeted electronic advertisement 144 is presented for the consumer 130. A targeted electronic advertisement 144 is efficient as it is ideally delivered only to a consumer 130 interested in the marketed good/service. In order to target the advertisement 144, various information is obtained from an identifiable consumer 130, such as sex, age, place of residence, nationality, language(s), hobbies, interests, consumer habits etc.

In a further disclosed embodiment, the advertising is initially free of charge for the advertiser 120 so that the advertiser 120 only pays for such advertisements 140, 144 that have resulted in a financial transaction 148. The payment for the electronic advertisement may be in the form of a commission. The consumer 130 may also be attracted to the targeted advertising by a discount and/or a bonus for each good/service or financial transaction.

In still another disclosed embodiment, the communication network 110 used to provide the electronic advertisement 144 from the server 102 to the consumer client 132 is at least one of the following: a mobile phone network, a cellular radio network, any standard/non-standard/proprietary radio system such as any mobile phone network, regardless of the generation (such as 2G, 3G, 4G, beyond 4G, etc.), GSM (Global System for Mobile Communications), GPRS (General Packet Radio Service), EGPRS (Enhanced GPRS), WCDMA (Wideband Code Division Multiple Access), evolved universal terrestrial radio access (E-UTRA) also known as long term evolution (LTE) or its recent LTE-Advanced versions (LTE-A). However, the disclosed embodiments are not restricted thereto, but may be applicable to other suitable radio systems (in their present forms and/or in their evolution forms), such as universal mobile telecommunications system (UMTS), a system based on International Mobile Telecommunication (IMT) standard or any one of its evolution versions (e.g. IMT-Advanced), WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, Wi-Fi, 3GPP (The 3rd Generation Partnership Project).

The advertiser system 122 may include, as a part of the system a retail point of sales (POS) system including a computer, monitor, cash drawer, receipt printer, customer display, barcode scanner, a debit/credit card reader, a weight scale, integrated credit card processing system, a signature capture device, a customer pin pad device etc. The POS system handles all kinds of customer based functions such as sales, returns, exchanges, customer loyalty programs etc. Besides handling the sales to the consumer, back-office functions such as inventory control, purchasing, receiving and transferring of products to and from other locations, storing sales information for reporting purposes, sales trends and cost/price/profit analysis etc. are handled by the POS system. However, for reasons of data security and trade secret, the part of the advertiser system 122 interacting with the server 102 may be isolated from the POS system.

The server 102 implementing the mobile or web advertising service may operate in a web server or in a cloud service, for example. This web service has interfaces for advertisers 120, consumer client applications 132 and the administrator. The advertiser's user interface may be a web page, a computer program or a mobile application. The advertiser 120 may enter product data for the advertised product, the advertisement validity period and the advertisement location. Entering the advertisement data may include entering data for several products either manually or electronically by using a camera or a barcode reader, for example. The web service may retrieve additional data for the advertised product from a computer network, from the Internet, for example. The advertiser 120 may edit or remove the advertisement afterwards. This web service may be implemented using existing web development tools. The web service may include a database having data for already entered advertisements, tokens reserved for future purchases, commissioned purchases, consumers, and client applications.

The consumer user interface 132 to the system may be a web page, computer program or a mobile application, for example. The mobile application is a good solution because it resides inside a personal device and is always with the consumer when making purchases. This mobile application may show a map displaying valid advertisements. It is also good in providing a list and/or search functionality for all advertisements according to the consumer's interests. There may also be a possibility to enter consumer preferences and loyalty program numbers to the consumer client application 132 in order to present the most applicable products and points of sale. By utilizing a loyalty program number, it is also possible to attach a specific consumer, a client application, an advertiser system and a transaction with each other. When a consumer 130 finds an interesting product from the advertisements, it is possible to checkmark it so that at the same time with or after a transaction it is possible to retrieve a transaction matching this consumer and this purchase based on the loyalty program number and to forward that transaction data to the web service. When the consumer 130 has received a token for the advertised product together with a purchase, s/he may enter it to the system either manually or electronically.

When the consumer client application 132 has received the token, the application 132 may connect to the web service 102 and forward the token to it. The web service 102 attaches the transaction to a previously entered advertisement data based on the token. Attaching the transaction 148 with the advertisement 140, 144 enables at least the following cases:

a) The advertiser 120 pays for the advertisement only after a transaction (purchase);
b) The web service 102 may constantly provide data to the advertiser 120 about effectiveness of the advertisement and, thus, the advertiser 120 may modify the advertisement accordingly;
c) The web service 102 may collect consumer behavior data, which is time, location, advertisement data and consumer segment specific. This data may be scientifically or commercially utilized;
d) The consumer 130 may be rewarded for purchases resulting from the advertisement 144. For example, they may receive a portion of the advertisement commission or by making purchases in certain way or a certain amount they may receive a larger sum from the commissions;
e) The advertisement 144 may be targeted for a specific consumer segment because the advertiser 120 pays for the advertisement only after consumers from this segment make purchases.

Figure 2:
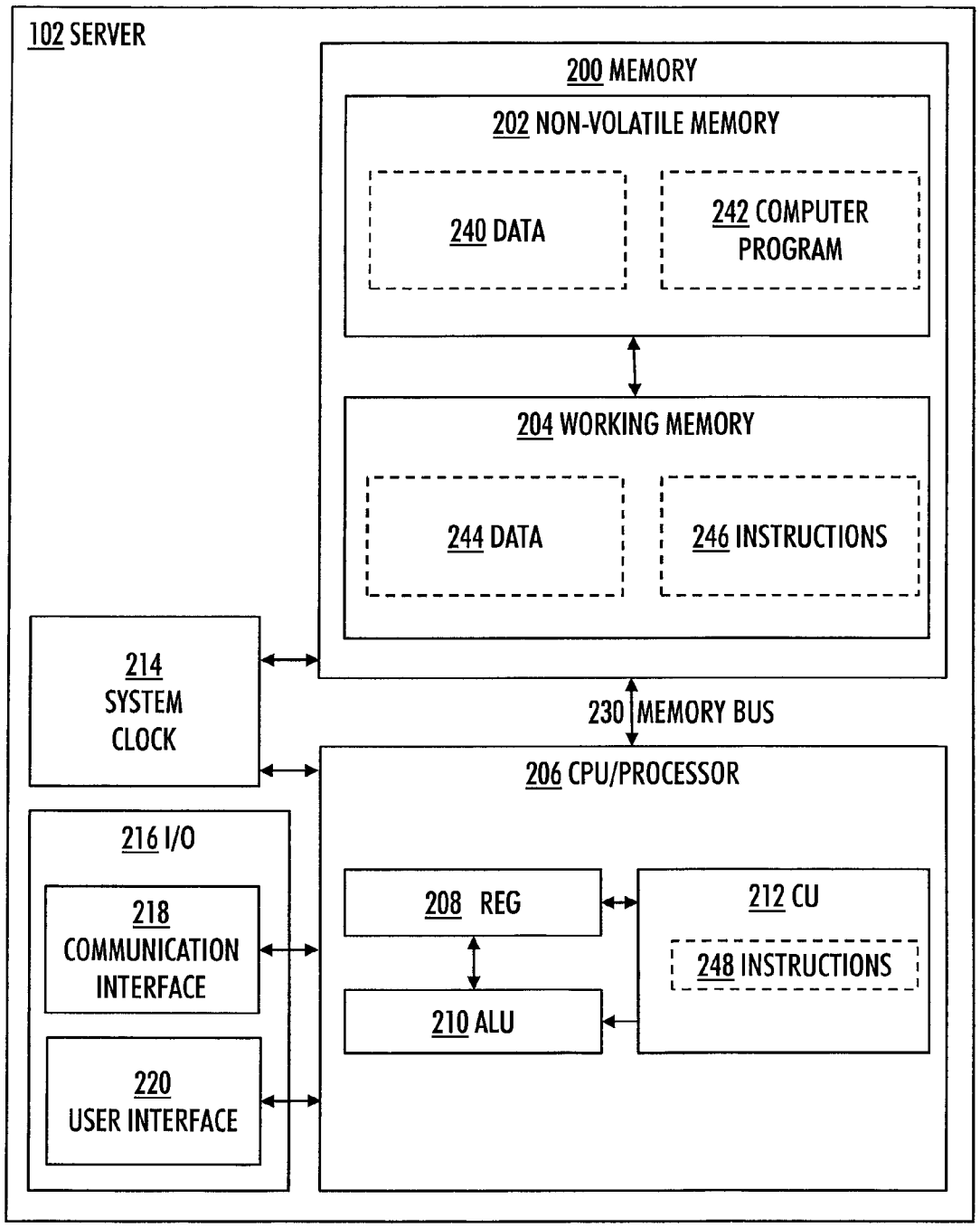
FIG. 2 shows disclosed embodiments of the server.

Now that the general environment has been described with reference to FIG. 1, let us turn into more detail with reference to FIG. 2 illustrating in more detail the server 102.

Note that the term 'server' in the context of this application is used to refer to the second party of the client-server computing model, whereby the server 102 may be a computer, such as a single server computer or a cluster of computers, but it may also be a functionality implemented by cloud computing, wherein the server 102 functionality is delivered as a service rather than a product, whereby shared resources, software, and information are provided to the advertiser system 122 and the consumer client 132 as a metered service (paid by the service provider 100) over the network 110. Also a hybrid of different implementations is possible, such as a combination of a one or more servers operated by the service provider 100 and cloud computing resources operated by an external computing service provider.

The server 102 comprises a communication interface 218, one or more processors 218, and one or more memories 200 storing instructions 246.

The term 'processor' 218 refers to a physical device that is capable of processing data in a computer or other digital electronic device. Depending on the processing power needed, the server 102 may comprise several processors 218 such as parallel processors or one or more multicore processors.

The term 'memory' 200 refers to a physical device that is capable of storing the instructions 246 and data 244 on a temporary or permanent basis for use in a computer or other digital electronic device. In at least one disclosed embodiment, the term 'memory' 200 refers to working memory 204 (also known as primary storage, main memory or internal storage) directly accessible to the processor 206. In another disclosed embodiment, the working memory 204 may be implemented as a random-access memory (RAM), such as a dynamic RAM, DRAM.

The instructions 210, when executed by the one or more processors 206, cause the server 102 to obtain unique electronic tokens for each potential (future) financial transaction 148 resulting from the electronic advertisement 144 of the advertiser to consumers.

The unique electronic tokens are identifiers that are passed between various actors. A token is a string of characters. Consequently, a token may include characters, which are numbers, letters, and/or symbols. Typically, a character set may include alphabets, and/or numbers, and/or other symbols. One typical character set is ASCII (The American Standard Code for Information Interchange). Tokens may also be numbers, in decimal number system, in hexadecimal number system, or in a number system of some other base. While forming the tokens, an encoding system may be followed, or, alternatively, the tokens may be arbitrary. The degree of uniqueness of the tokens may vary: a token may be globally unique, i.e., one token refers to only one particular object in the universe, or a token may be unique within the system, i.e., for the lifetime of the system one token refers to only one particular object within the system. Furthermore, a token may be unique for a certain time, i.e. for its lifetime one token refers to only one particular object within the system, but after its expiry, the same token may be reused so that it refers to a different object within the system.

The instructions 210, when executed by the one or more processors 206, cause the server 102 to store the unique electronic tokens as stored tokens associated with the electronic advertisement, and transmit, through the communication interface 218, the unique electronic tokens as distributed tokens to the advertiser. In at least one disclosed embodiment, the stored tokens are stored in the memory 200. In another disclosed embodiment, the memory 200 may be non-volatile memory 202 (also known as secondary storage or external memory). In effect, the service provider 100 retains a copy of every obtained token as stored tokens, while the service provider 100 also distributes a copy of every obtained token as distributed tokens to the advertiser 120.

After receiving the token, the advertiser 120 may store it electronically to the advertiser system 122, or mechanically to a paper printout or sticker, for example. The advertiser 122 may provide the token to the consumer client 132 in relation to the transaction 148 either automatically in almost real-time or later, or manually as a separate operation, e.g., by giving the consumer a mechanical printout or sticker, or transferring the electronic token wired or wirelessly from the advertiser system 122 to the consumer client 132.

The instructions 210, when executed by the one or more processors 206, cause the server 102 to receive, through the communication interface 218, at least one of the distributed tokens that has been passed from the advertiser 120 to a consumer 130 in relation to a financial transaction 148 based on the electronic advertisement 144, and associate each financial transaction 148 identified by the received distributed token with the electronic advertisement 144 identified by the stored tokens, if the received distributed token matches with the stored token.

Figure 5:
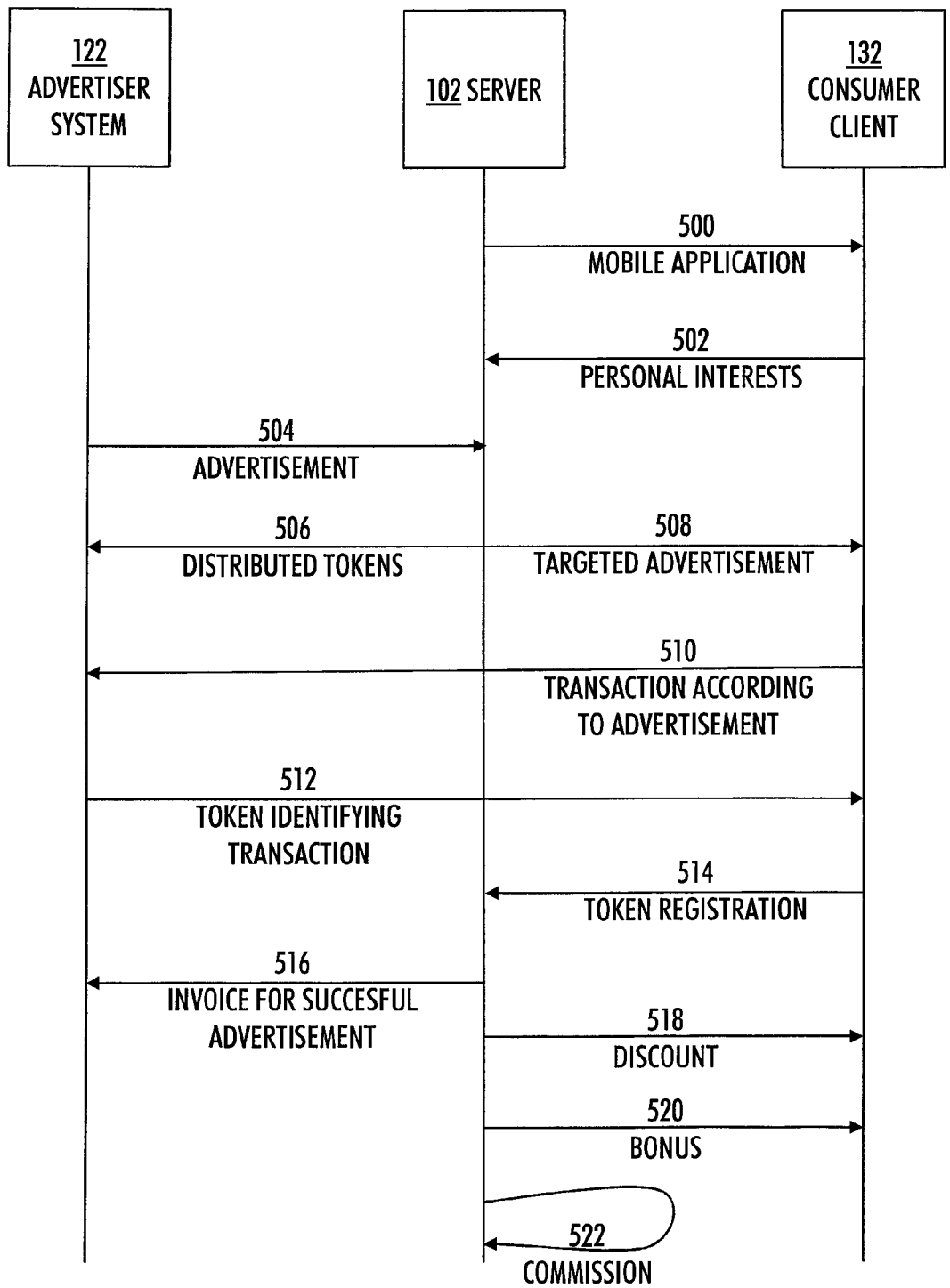
FIG. 5 is a signal sequence chart illustrating disclosed embodiments of information flow between the advertiser system, the server, and the consumer client.

The described five-step operation (obtaining, storing, transmitting, receiving, and associating) relating to tokens implements a part of the sequence described next with reference to FIG. 5 illustrating information flow between the advertiser system 122, the server 102, and the consumer client 132.

The server 102 provides a mobile application 500 for the consumer client 132, whereupon the consumer 130 may use the mobile application 500 to input personal interests 502 to the server 102 so that the consumer 130 may be subjected to targeted advertising.

The advertiser system 122 inserts the electronic advertisement 140/504 to the server 102.

The server 120 reserves unique tokens for each possible future transaction resulting from the electronic advertisement 140/504.

The consumer client 132 retrieves (targeted) advertisement 144/508 from the server 102.

The server 102 transmits the distributed tokens 506 to the advertiser system 122.

In at least one disclosed embodiment, the one or more memories 200 further store instructions 246, that, when executed by the one or more processors 206, cause the server 102 to receive, through the communication interface 218, the electronic advertisement 140 from the advertiser 122, and transmit, through the communication interface 218, the electronic advertisement 144/504 to the consumers 130.

The consumer 130 makes a financial transaction 510 such as a purchase (either in a shop or in a web store) with the advertiser 120 based on the electronic advertisement 144/504. Together with the transaction, the advertiser system 122 provides the unique token 512 identifying the transaction 148/510 to the consumer client 132.

The consumer client application 132 registers 514 the token to the server 102, which attaches the transaction 148/510 to the electronic advertisement 144/504.

In at least one disclosed embodiment, the one or more memories 200 further store instructions 246, that, when executed by the one or more processors 206, cause the server 102 to obtain, through the communication interface 218, consumer discount information and/or consumer bonus information and/or service provider commission information relating to the electronic advertisement 140, 144, 504, 508 from the advertiser, and generate for each financial transaction 148/510 an invoice 516 for the advertiser covering a sum determined by the consumer discount information and/or consumer bonus information and/or service provider commission information. The server 102 provides the discount 518 and/or bonus 520 for the consumer client 132, and registers the commission 522. Naturally, the invoices for discount and/or bonus and/or commission of one consumer 130 may be combined into one single invoice, and invoices of different consumers may also be combined into a single combined invoice.

Let us take an example. The advertiser 120 normally sells sneakers for 99.90 €. In the advertisement 144/504 according to the consumer discount information the price is discounted by about 40%, and, consequently, the price for which the tokens are reserved is 59€. According to the service provider commission information, the service provider 100 gets 2.50€ (=about 4%). Furthermore, according to the consumer bonus information, the consumer gets 2.50 € (=about 4%) as a further reward. In practice, the service provider 100 may invoice the total sum, 5€, from the advertiser 120, and then return 2.50 € for the consumer 130 and keep 2.50 € as the commission. In summary, the advertiser gets 59 €, of which 2.50 € is returned for the service provider as the commission, and 2.50 € for the customer as the bonus. This example also highlights one way for the advertiser 120 to know whether the transaction 148/510 really resulted from the advertisement 144/504: the price 59 € is such it is only offered in the advertisement 144/504, and, consequently, the buyer 130 cannot know it if s/he has not seen/heard the advertisement 144/504. The consumer 130 also triggers the sequence, because s/he wants discount and/or bonus promised in the advertisement 144/504, and, consequently, the consumer 130 asks the advertiser 120 for the token 512. The bonus for the consumer 130 may be in various formats: money, bonus points, vouchers, lottery tickets etc.

The processor 218 and the memory 102 may be implemented by an electronic circuitry. When designing the implementation of the processor 218 and the memory 200, a person skilled in the art will consider the requirements set for the size and power consumption of the server 102, the necessary processing capacity, production costs, and production volumes, for example.

A non-exhaustive list of implementation techniques for the processor 206 includes, but is not limited to:

logic components,
standard integrated circuits,
application-specific integrated circuits (ASIC),
system-on-a-chip (SoC),
application-specific standard products (ASSP),
microprocessors,
digital signal processors,
special-purpose computer chips, and
field-programmable gate arrays (FPGA).

In the disclosed embodiment illustrated in FIG. 2, the server 102 may be an electronic digital computer, which may comprise, besides the processor 206 and the working memory 204, a non-volatile memory 202, a system clock 214 and an input/output 216 including a user interface 220. Naturally, the computer may comprise a number of other peripheral devices, not illustrated here for the sake of clarity.

In another disclosed embodiment, the system clock 214 constantly generates a stream of electrical pulses, which cause the various transferring operations within the computer to take place in an orderly manner and with specific timing.

In yet another disclosed embodiment, the processor 206 may be implemented as a microprocessor implementing functions of a central processing unit (CPU) on an integrated circuit. The CPU 206 is a logic machine executing a computer program 242, which comprises the program instructions 246. The instructions 246 may be coded as a computer program using a programming language, which may be a high-level programming language, such as C, C++, or Java, or a low-level programming language, such as a machine language, or an assembler.

The CPU 206 may comprise a set of registers 208, an arithmetic logic unit (ALU) 210, and a control unit (CU) 212. The control unit 212 is controlled by a sequence of instructions 248 transferred to the CPU 206 from the working memory 204. The working memory 204 is directly or indirectly connected to the CPU 206 via a memory bus 230 including two buses: an address bus and a data bus. The CPU 206 sends a memory address indicating the desired location of data (=data 244 or instructions 246) number through the address bus, whereupon the CPU 206 reads or writes the data itself from/to the working memory 204 using the data bus.

The control unit 212 may contain a number of microinstructions for basic operations. The implementation of the microinstructions may vary, depending on the CPU design. The microprocessor 206 may also have an operating system (a dedicated operating system of an embedded system, or a real-time operating system), which may provide the computer program 242 with system services. During running of the program 242, the instructions 246 are transferred via the memory bus 230 from the working memory 204 into the control unit 212, wherein usually a portion 248 of the instructions 246 resides and controls the operation.

In still another disclosed embodiment, the non-volatile memory 202 retains the stored information even when not powered. Examples of non-volatile memory include read-only memory (ROM), flash memory, magnetic computer storage devices such as hard disk drives, and optical discs. As is shown in FIG. 2, the non-volatile memory 202 may store both data 240 and the computer program 242 comprising the instructions 246.

Disclosed embodiments provide a computer program 242 comprising the instructions 246 which, when loaded into a computer constitute the processing means. In at least one disclosed embodiment, the computer program 242 may be in source code form, object code form, or in some intermediate form. The computer program 242 may be stored in a carrier, which may be any entity or device capable of carrying the program 242 to the server 102. The carrier may be a computer-readable storage medium. Besides this, the carrier may be implemented as follows, for example: the computer program 242 may be embodied on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the carrier may not be the telecommunications signal. The medium may be a non-transitory computer-readable storage medium.

There are many ways to structure the program 242. In at least one disclosed embodiment, the operations of the program may be divided into functional modules, sub-routines, methods, classes, objects, applets, macros, etc., depending on the software design methodology and the programming language used. In modern programming environments, there are software libraries, i.e. compilations of ready-made functions, which may be utilized by the program for performing a wide variety of standard operations.

Now that the server 102 has been described with reference to FIG. 2, the consumer client 132 may be studied in more detail with reference to FIG. 3. The consumer client 132 may be any electronic apparatus usable by the consumer 130 and capable of presenting the electronic advertisement 144 to the consumer 130. A non-exhaustive list of the types of the consumer client 132 includes: an electronic digital computer, a portable computer, a laptop computer, a tablet computer, a mobile phone, a smartphone. The consumer client 132 may be iPhone, iPad, Android phone, or Windows Phone, for example.

The aforementioned types of the consumer client 132 all include an electronic digital computer, and, consequently, the discussion of the server 102 with reference to FIG. 2 may also be applied to the implementation of the computer functionality of the consumer client 132.

The consumer client 132 comprises a communication interface 304/306, an input interface 302/308, one or more processors 312, and one or more memories 314 storing instructions 316.

The instructions 316, when executed by the one or more processors 312, cause the consumer client 132 to receive, through the communication interface 304/306, the electronic advertisement 144/508 of the advertiser 120, receive, through the input interface 302/308, a distributed token 512 that has been passed from the advertiser 120 to the consumer 130 in relation to the financial transaction 148/510 based on the electronic advertisement 144/508, and transmit, through the communication interface 304/306, the distributed token 512 to the server 102 in order to associate the financial transaction 148/510 identified by the received distributed token 512 with the electronic advertisement 140, 144, 504, 508 so that the consumer 130 receives from the financial transaction 148/510 the discount 518 and/or the bonus 520.

If the consumer client 132 is portable, it may include a battery 300 storing electric energy. The (rechargeable) electrical battery 300 is one or more electrochemical cells that convert stored chemical energy into electrical energy. Instead of battery 300, other suitable accumulator means may be used to store energy. Alternatively, or additionally, the consumer client 132 may obtain electric energy from the mains.

Figure 3:
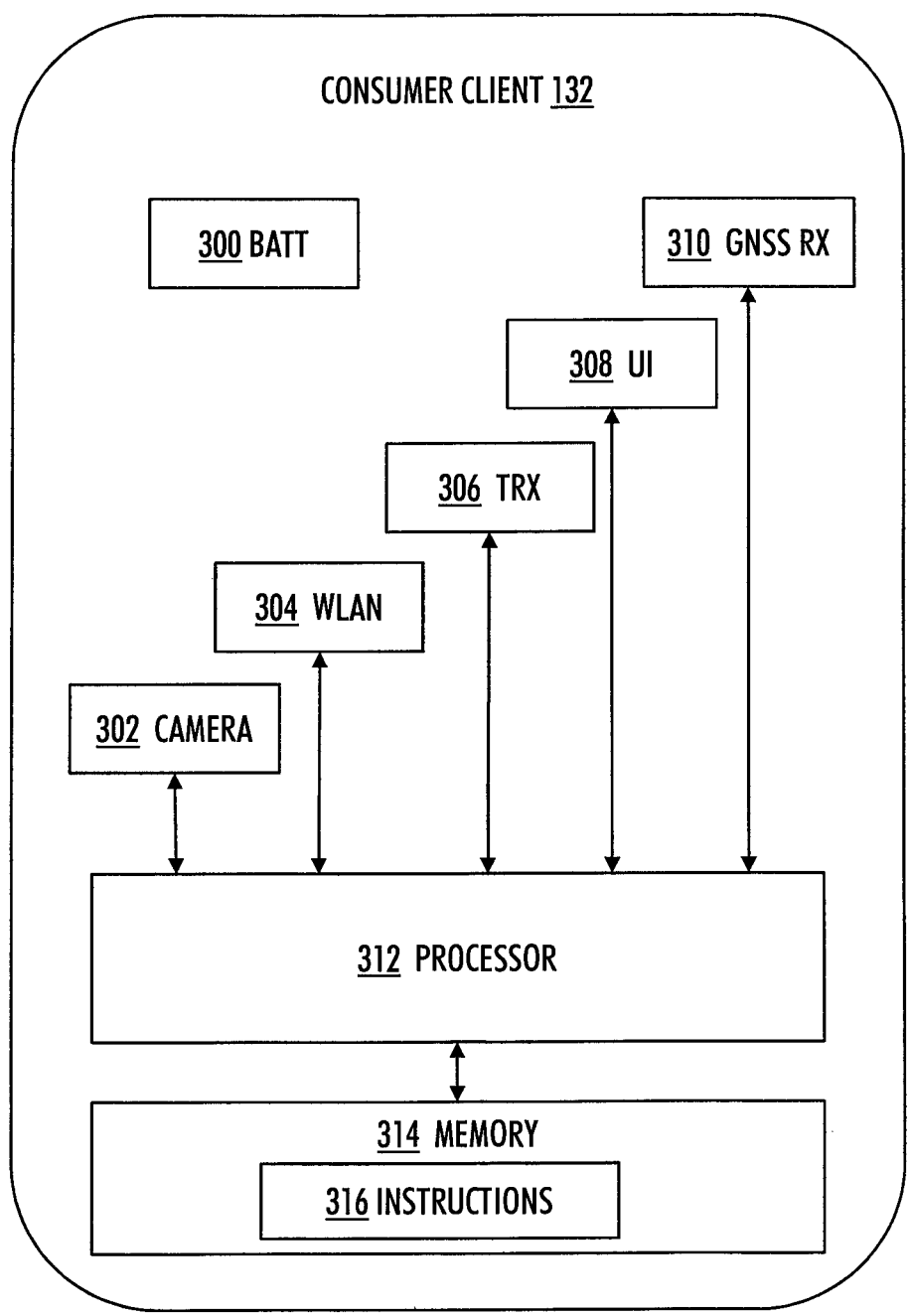
FIG. 3 shows disclosed embodiments of the consumer client.

As shown in FIG. 3, the communication interface may be a WLAN transceiver 304 and/or a cellular transceiver 306, but it may be also any other wired/wireless communication circuit capable of communicating through the communication network 110 with the server 102.

As shown in FIG. 3, the input interface may be a digital camera 302 and/or a user interface 308, but it may also be any other means for inputting the token 512 to the consumer client 132 for transmission to the server 102.

In at least one disclosed embodiment, the advertiser system 122 prints or displays the token 512 in the form of a barcode, and the consumer 130 takes a photo of the barcode, whereupon the mobile application 500 or the server 102 is capable of interpreting from the photo the token 512.

In another disclosed embodiment, the advertiser system 122 prints or in some other way communicates the token 512, so that the token 512 may be inputted with the user interface 308 of the consumer client 132 to the mobile application 500. In another disclosed embodiment, the consumer 130 may input the token 512 with a keyboard/keypad/touch screen. The user interface 308 may comprise a display, means for producing sound, a keyboard, and/or a keypad, for example. The display may be a liquid crystal display, for example, but it may also be implemented by any appropriate prior art technique, such as with an active-matrix organic light-emitting diode. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 308 may comprise other user interface elements, for example various means for focusing a cursor (mouse, track ball, various arrow keys, touch sensitive area etc.) or elements enabling audio control.

In yet another disclosed embodiment, the token 512 is communicated from the advertiser system 122 to the consumer client 132 in a wireless/wired fashion, such as by RFID (Radio Frequency Identification), NFC (Near Field Communication), Bluetooth, WLAN, or through the communication network 110 by a radio connection, or through a physical interface such as USB (Universal Serial Bus), or any other applicable connection.

In a further disclosed embodiment, the consumer client 132 may comprise positioning receiver 310 receiving external location information, which may be utilized to generate location of the consumer client 132. The positioning receiver 310 may be a receiver of a global navigation satellite system (GNSS). Such a system may be the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. The positioning receiver 310 determines its location (longitude, latitude, and altitude) using signals transmitted from satellites orbiting the earth. Besides global navigation satellites, the positioning receiver 310 may also determine its location by utilizing other known positioning techniques. It is well known that by receiving radio signals from several different base stations, a mobile phone may determine its location, for example. The location of the consumer client 132 may be communicated to the server 102 in order to provide such targeted advertising 144 that takes into account also the location of the consumer 130 in relation to the premises of the advertiser 120. The location data may be fused together with a map application such as Google Maps, Nokia Maps, Navteq, or even with a navigation application.

Figure 4:
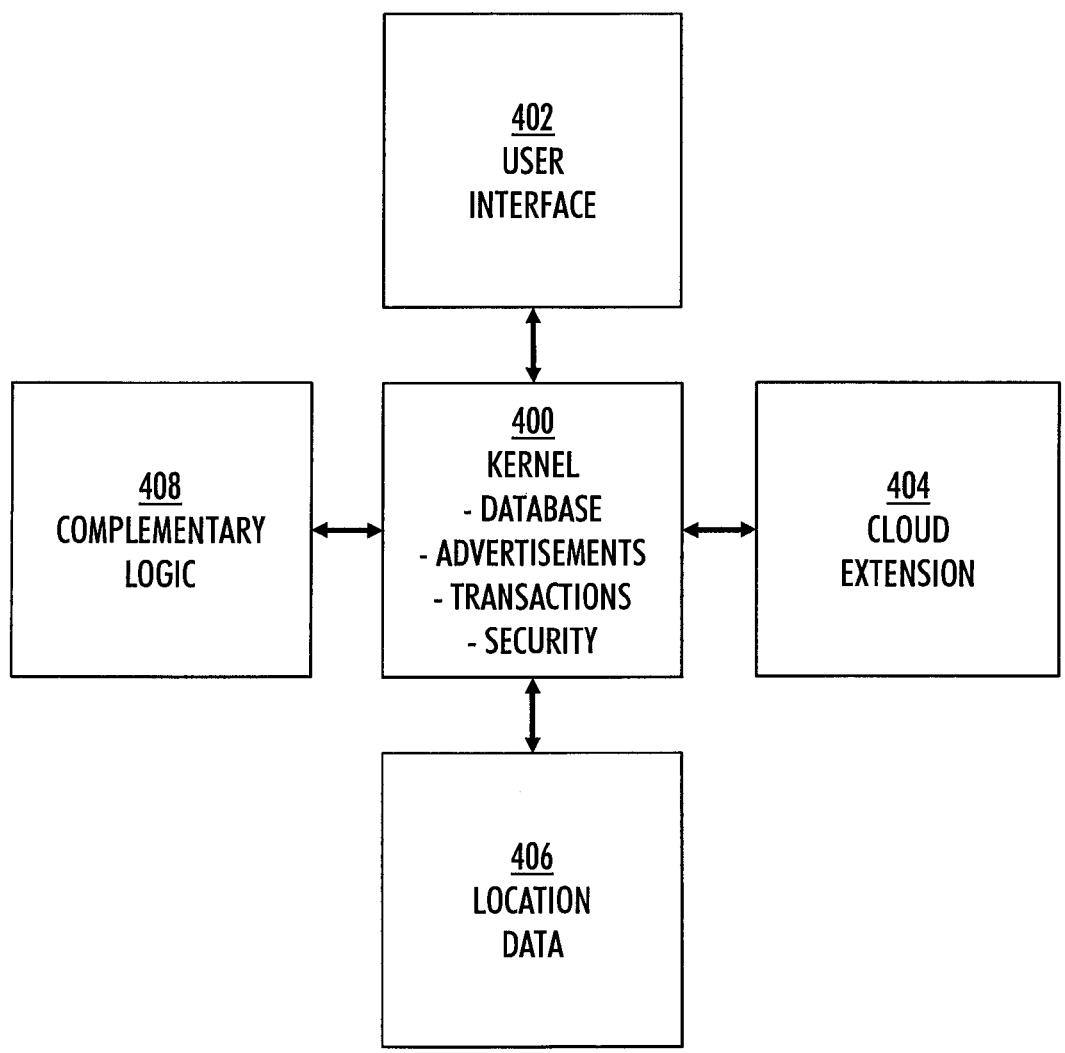
FIG. 4 shows disclosed embodiments of the server.

FIG. 4 illustrates some further disclosed embodiments relating to the server 102. The kernel 400 of the server 102 functionality utilizes a database, and processes the advertisements and the transactions in a data-secure manner. The user interface 402 and the location data 406 interact with the kernel 400. The user interface 402 may be based on web interface, mobile browser, web browser, Windows, MacOS, Linux, Android, iOS, Windows Mobile, or any other suitable operating system. The user interface 402 may also be encapsulated as a part of some existing user interface offered to consumers. As was already said earlier, some parts of the server 102 functionality may be realized in a cloud extension 404, possibly utilizing social media such as Facebook or Twitter. Furthermore, complementary logic 408 may be utilized in order to embed the advertising platform in various applications such as games or guides (such as tourist or city guides). The consumer client application 132 may be downloadable from an application store of each operating environment, such as iStore.

Figure 6:
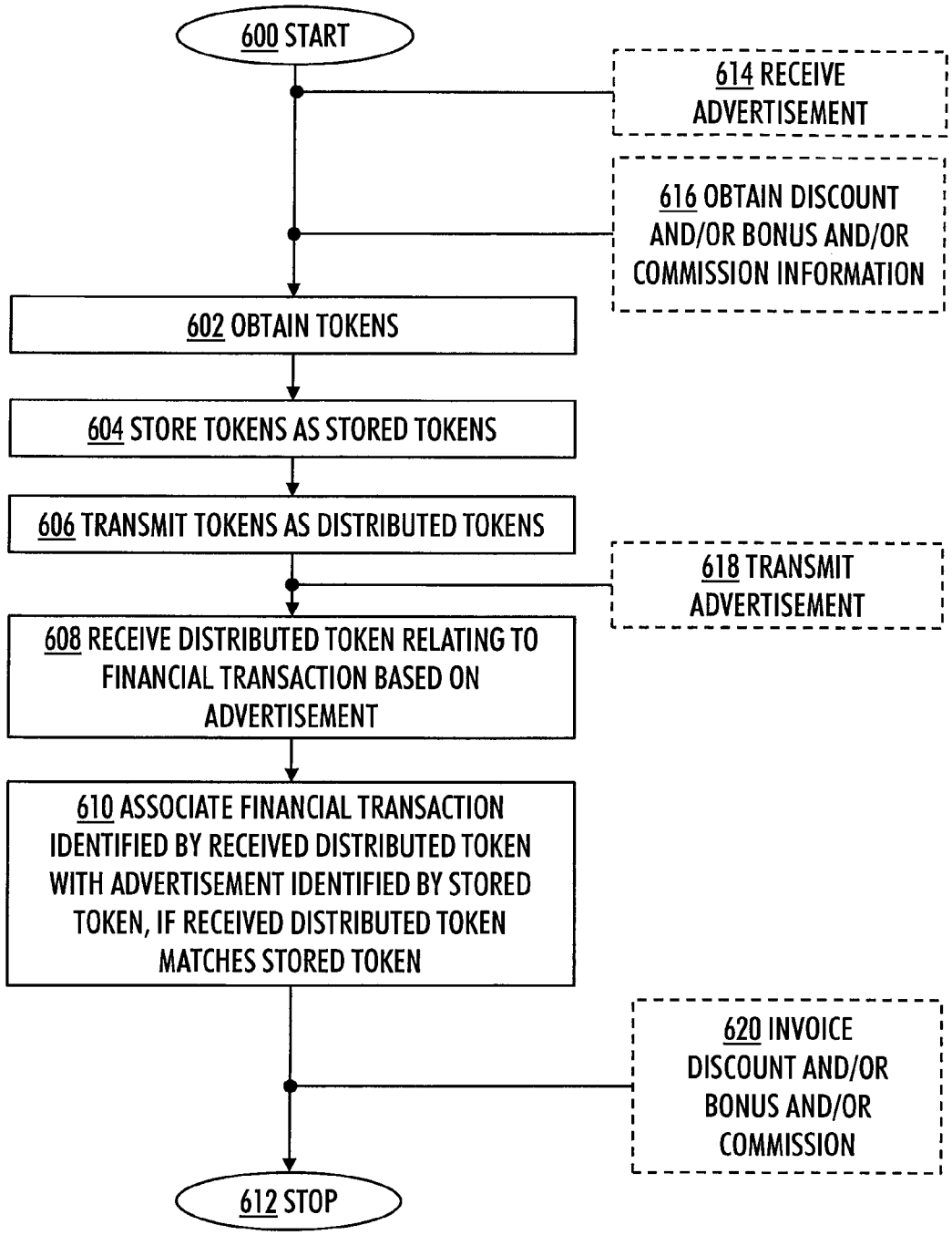
FIG. 6 is a flow chart illustrating disclosed embodiments of a method.

Next, disclosed embodiments of a method will be described with reference to FIG. 6. Other functions, not described in this application, may also be executed between the operations or within the operations. Some of the operations or parts of the operations may also be left out or replaced by a corresponding operation or part of the operation. The method starts in 600.

In 602, unique electronic tokens are obtained for each potential financial transaction resulting from an electronic advertisement of an advertiser to consumers.

In at least one disclosed embodiment, the electronic advertisement relates to at least one of the following: a good, a service, a sales item subjected to the financial transaction.

In 604, the unique electronic tokens are stored as stored tokens associated with the electronic advertisement.

In 606 the unique electronic tokens are transmitted as distributed tokens to the advertiser.

In 608, at least one of the distributed tokens that has been passed from the advertiser to a consumer in relation to a financial transaction based on the electronic advertisement is received.

In 610, each financial transaction identified by the received distributed token is associated with the electronic advertisement identified by the stored tokens, if the received distributed token matches with the stored token.

The method ends in 612.

The disclosed embodiments of the earlier described apparatuses 102, 122, 132 may also be used to enhance the method. In at least one disclosed embodiment, the method may be implemented in the server 102 described earlier. In another disclosed embodiment, a computer program comprises instructions which, when loaded into the server 102, cause the server 102 to perform the described process. In yet another disclosed embodiment, a computer-readable storage medium comprises the computer program.

Next, further disclosed embodiments of the method will be described. These disclosed embodiments may be freely combined with each other in order to produce further embodiments.

In at least one disclosed embodiment, the method further comprises: receiving 614 the electronic advertisement from the advertiser, and transmitting 618 the electronic advertisement to the consumers.

In another disclosed embodiment, the method further comprises: obtaining 616 consumer discount information and/or consumer bonus information and/or service provider commission information relating to the electronic advertisement from the advertiser, and generating 620 for each financial transaction an invoice for the advertiser covering a sum determined by the consumer discount information and/or consumer bonus information and/or service provider commission information.

It will be obvious to a person skilled in the art that, as technology advances, the inventive concept can be implemented in various ways. The invention is not limited to the disclosed embodiments but may vary within the scope of the claims.

The invention claimed is:

1. A service-provider server comprising:
a service-provider communication interface coupled to a communication network;
one or more service-provider processors; and
one or more memories that store instructions, that, when executed by the one or more service-provider processors, cause the service-provider server to:
receive, through the service-provider communication interface, an electronic advertisement from an advertiser, via the communication network; and transmit, through the service-provider communication interface, the electronic advertisement to consumers via the communication network on behalf the advertiser;

form unique electronic tokens for each financial transaction associated with the advertiser's electronic advertisement;

store the unique electronic tokens as stored tokens associated with the advertiser's electronic advertisement;

transmit, to the advertiser, through the service-provider communication interface, the unique electronic tokens as distributed tokens to the advertiser for subsequent distribution to consumers in response to transactions between the advertiser and the consumers;

receive, through the service-provider communication interface, at least one of the distributed tokens from a consumer following transmission of the distributed token from the advertiser to the consumer in response to a transaction between the advertiser and the consumer;

associate the financial transaction identified by the received at least one distributed token with the electronic advertisement identified by at least one stored token, if the received at least one distributed token matches one of the stored unique electronic tokens associated with the advertiser's electronic advertisement; and provide a discount and/or bonus to the consumer for the transaction based on the match.

2. The service-provider server of claim 1, wherein the one or more memories further store instructions, that, when executed by the one or more processors, cause the service-provider server to:

obtain, through the service-provider communication interface, consumer discount information relating to the advertiser's 1 electronic advertisement; and generate, for each financial transaction associated with the advertiser's electronic advertisement in the received at least one distributed token, an invoice for the advertiser covering a sum determined by the consumer discount information.

3. The service-provider server of claim 1, wherein the one or more memories further store instructions, that, when executed by the one or more processors, cause the service-provider server to:

obtain, through the service-provider communication interface, consumer bonus information relating to the advertiser's electronic advertisement; and generate, for each financial transaction associated with the advertiser's electronic advertisement in the received at least one distributed: token, an invoice for the advertiser covering a sum determined by the consumer bonus information.

4. The service-provider server of claim 1, wherein the one or more memories further store instructions, that, when executed by the one or more processors, cause the service-provider server to:

obtain, through the service-provider communication interface, service-provider commission information relating to the advertiser's electronic advertisement; and generate for each financial transaction associated the advertiser's electronic advertisement in the received at least one distributed token, an invoke for the advertiser covering a sum determined by the service-provider commission information.

5. The service-provider server of claim 1, wherein the electronic advertisement relates to at least one of the following: a good, a service, or a sales item subjected to the financial transaction.

6. A computer program comprising instructions which, when loaded into a computer constitute the one or more service-provider processors of claim 1.

7. A consumer client comprising:

one or more processors; and one or more memories storing instructions, that, when executed by the one or more processors, cause;

receive, through a service-provider communication interface, an advertiser's electronic advertisement transmitted by a service-provider server via the service-provider communication interface which is coupled to a communication network, wherein the electronic advertisement is transmitted on behalf of the advertiser;

receive, through an input interface, a unique distributed token that has been formed by the service-provider, provided to the advertiser by the service-provider and passed from the advertiser to a consumer in relation to a financial transaction based on the advertiser's electronic advertisement; and transmit, through the service-provider communication interface, the distributed token to the service-provider server to associate the financial transaction identified by the received unique distributed token with the advertiser's electronic advertisement so that the consumer receives a discount and/or a bonus from the financial transaction.

8. A computer program comprising instructions which, when loaded into a computer constitute the one or more processors of claim 7.

9. A method comprising:

receiving, by a service-provider server, an electronic advertisement from an advertiser;

transmitting, by the service-provider server on behalf of the advertiser, the advertiser's electronic advertisement to consumers;

forming, by the service-provider server, unique electronic tokens for each financial transaction associated with the advertiser's electronic advertisement;

storing, by the service-provider server, the unique electronic tokens as stored tokens associated with the advertiser's electronic advertisement;

transmitting to the advertiser via the service-provider communication interface, by the service-provider server, the unique electronic tokens as distributed tokens;

receiving, by the service-provider server via the service-provider communication interface, at least one of the distributed tokens from a consumer following transmission of the at least one distributed token from a consumer following transmission of the distributed token from the advertiser to the consumer in response to a transaction between the advertiser and the consumer; and associating, by the service-provider server, the financial transaction identified by the at least one received distributed token with the advertiser's electronic advertisement identified by at least one stored token, if the received at least one distributed token matches one of the store unique electronic tokens associated with the advertiser's electronic advertisement; and providing a discount and/or bonus to the consumer for the transaction based on the match.

10. The method of claim 9, further comprising:
obtaining, through the service-provider communication interface, by the service-provider server, consumer discount information relating to the advertiser's electronic advertisement; and
generating, by the service-provider server, for each financial transaction associated with the advertiser's electronic advertisement in the received at least one distributed token, an invoice for the advertiser covering a sum determined by the consumer discount information.

11. The method of claim 9, further comprising:
obtaining, by the service-provider server, consumer bonus information relating to the advertiser's electronic advertisement; and
generating, by the service-provider server, for each financial transaction associated with the advertiser's electronic advertisement in the received at least one distributed token, an invoice for the advertiser covering a sum determined by the consumer bonus information.

12. The method of claim 9, further comprising:
obtaining, by the service-provider server, service-provider commission information relating to the adveitiser's electronic advertisement; and
generating, by the service-provider server, for each financial transaction associated with the advertiser's electronic advertisement in the received at least one distributed token, an invoice for the advertiser covering a sum determined by the service-provider commission information.

13. The method of claim 9, wherein the electronic advertisement relates to at least one of the following: a good, a service, a sales item subjected to the financial transaction.

\* \* \* \* \*